June 16, 1964 S. D. MOXLEY, JR 3,137,849
RADAR AIR TRAFFIC CONTROL SYSTEM
Filed May 16, 1962 4 Sheets-Sheet 1

INVENTOR.
STEPHEN D. MOXLEY, JR.
BY Alden W. Redfield
Irwin P. Garfinkle
ATTORNEYS.

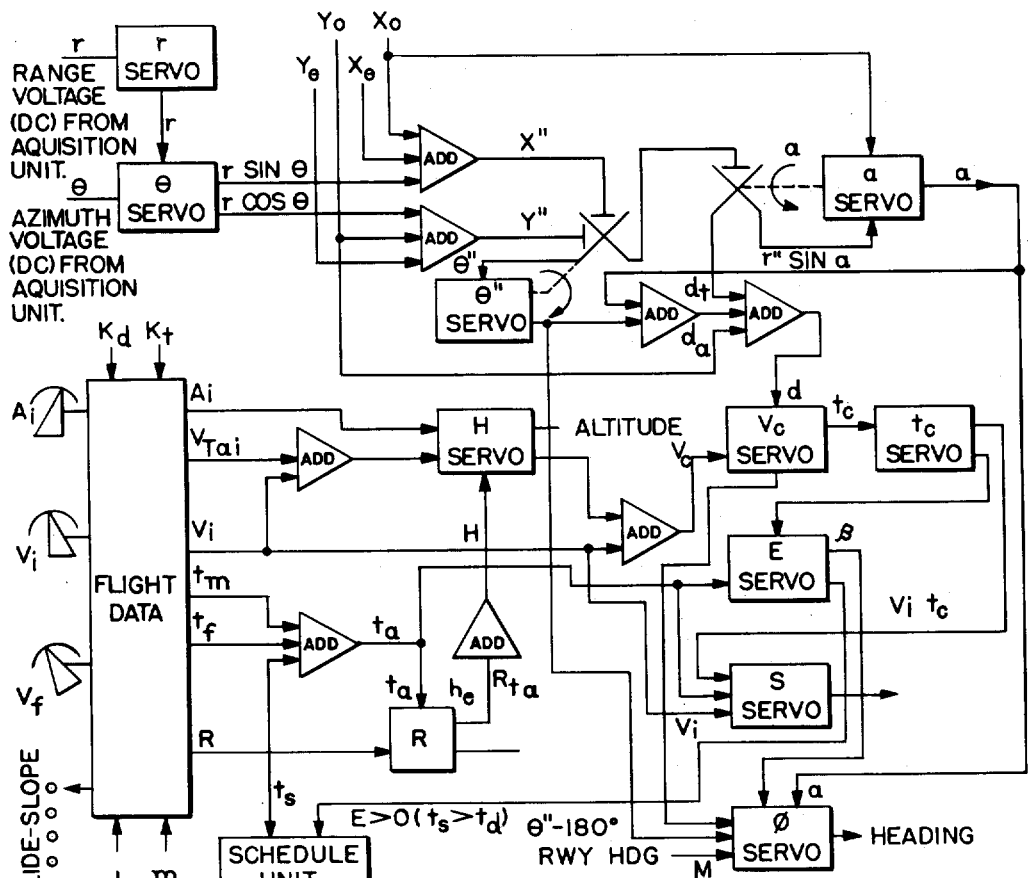
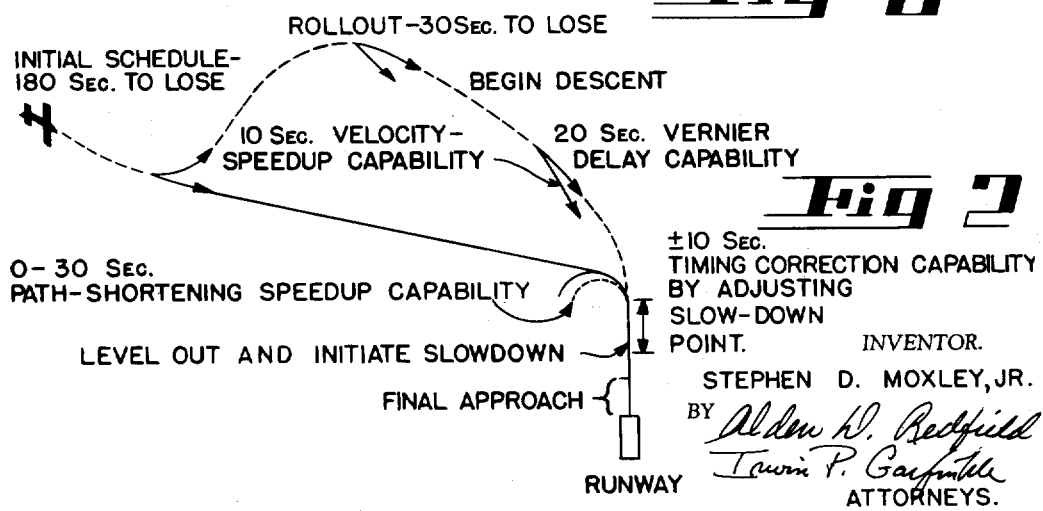

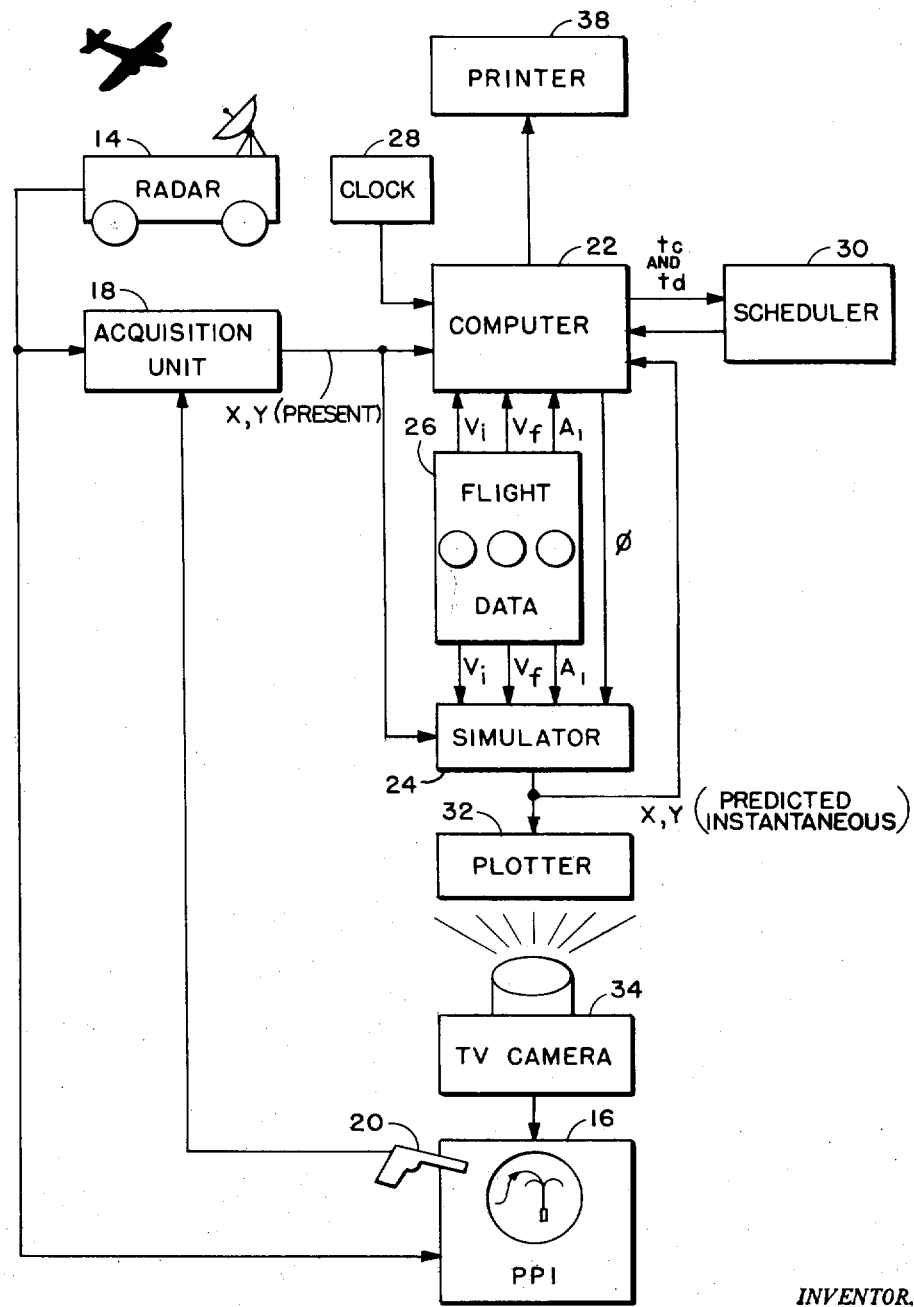

INVENTOR.
STEPHEN D. MOXLEY, JR.

United States Patent Office 3,137,849
Patented June 16, 1964

3,137,849
RADAR AIR TRAFFIC CONTROL SYSTEM
Stephen D. Moxley, Jr., Cincinnati, Ohio, assignor to Avco Corporation, Cincinnati, Ohio, a corporation of Delaware
Filed May 16, 1962, Ser. No. 195,086
11 Claims. (Cl. 343—10)

This invention relates to a novel radar air traffic control system in which the predicted flight path of an aircraft from its present position to the entry point of a landing system and to touchdown at predetermined times is visually presented on the controller's PPI scope.

Due to the high density of air traffic and the widely varying speeds and altitudes of aircraft, a major problem in traffic control occurs within a sixty to ninety mile radius surrounding every high density airport. The most efficient method of controlling aircraft within this radius has involved the use of radar vectoring; i.e., the aircraft pilot is provided with instructions for heading and rate of descent by the radar controller. The present invention involves an improvement in the radar vectoring system which permits safer and more efficient control.

Present-day concepts using radar vectoring techniques are based on maintaining a space separation between the aircraft within the control range. Time separation is only a secondary consideration determined not by plan, but resulting only from the rules of space separation. With increasing numbers of aircraft, each operating at widely varying speeds, the space-separation techniques leave much to be desired. To achieve the safest, fastest, and most efficient control within the bounds of aircraft performance and runway acceptance rates, both space and time separation must be taken into consideration. To produce both minimum space and minimum time separation, this invention uses the concept of advance "scheduling" of the times of arrival of the aircraft at the entry point of the landing system and at touchdown, and a computation of the path to be flown for assuring arrival at those points at the scheduled time. The flight path, having been computed at the beginning of the flight, is plotted and presented by video-map or other techniques on the controller's PPI scope, where it is used as the "predicted" path of the aircraft. With the predicted path presented simultaneously with present aircraft position, the controller is able to compare the actual flight path with the predicted path, and he can then intelligently and quickly issue vectoring instructions to the aircraft pilot for maintaining the aircraft on the predicted path. The controller is also provided with a print out of computed heading instructions and a permanent visual map.

With current methods, radar controllers must rely upon crude, visual-estimating techniques in vectoring aircraft onto final approach, and no provision is made for succeeding aircraft to maintain adequate separation as the aircraft paths converge towards a common runway. The surveillance radar display provides insufficient data for positive decisions, and this results in overconservative control, thus leaving large gaps between aircraft, slowing the traffic, and reducing the normal capability of the terminal facility. Moreover, a temporary radar failure leaves the radar controller with insufficient data on aircraft positions for safe, interleaved approaches. Thus, there is a need for an improved radar vectoring control system which takes into account both space and time factors, and which provides sufficient data in the event of radar failure to permit continued safe control.

It is, therefore, the broad object of this invention to provide a system which yields a precise prediction of each incoming aircraft's future time positions from point of detection to touchdown, and that assures adequate radar backup for sufficient exact data under the most adverse conditions.

Another object of the present invention is to provide a man-machine system supplement to present air traffic control equipment, to provide the needed data to enhance safe, reliable operation of air terminals towards their absolute maximum capacity at all times.

Another object of this invention is to provide a novel air traffic control system in which the predicted future path of an aircraft is computed and presented on a radar scope to enable the radar operator to visually compare the actual position of the aircraft with the predicted position, both in time and space.

Still another object of this invention is to provide a system which enables a precise prediction of each incoming aircraft's future time positions from point of detection to touchdown.

For further objects and for a more detailed description of the invention, reference should now be made to the following specification and to the accompanying drawings in which;

FIG. 2 represents a typical predicted flight path for an aircraft detected at a range of approximately ninety miles from the runway;

FIG. 4 is a functional block diagram showing the overall system for plotting predicted paths;

FIG. 5 is a functional block diagram of an analog computer which may be used in the system of FIG. 4;

Figure 1:
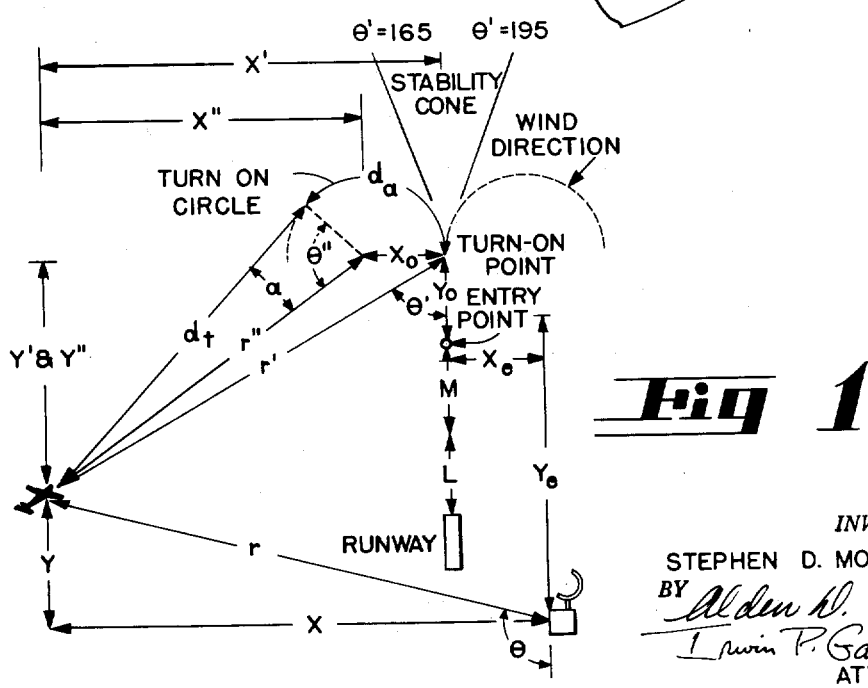
FIG. 1 illustrates the arrival geometry of a typical runway.

The air traffic control problem is illustrated in FIG. 1 where the flight geometry of a typical runway is shown. An aircraft detected by the system radar at a range $r$ cannot fly in a straight line to the runway, but its most "direct" permissible path is around a "turn-on circle," the dimensions and locations of which are fixed for a particular airport for each aircraft type. Thus, the most direct path $d$ to the "entry point" of a runway is along the leg $d_t$ (tangent to the turn-on circle), the arc $d_a$ of the turn-on circle, and leg $y_0$. Flying at prescribed velocities and taking wind drift, altitude, and rate of descent into account, if the aircraft accurately follows the most direct path, it would arrive at the entry point of the landing system at a "final approach" time $t_c$ and at the runway at a "touchdown" time $t_d$. For any given aircraft velocity, the computer utilized in accordance with this invention is capable of determining $t_c$ and $t_d$, and also of rapidly generating functions representing the direct path to be flown. The computed times $t_c$ and $t_d$ along the direct path are fed into a "scheduler" which provides a visual indication of these times for all controlled aircraft. If it appears that no conflict in time with another aircraft will occur, these times are the "scheduled" times (from "present" time) of the aircraft and the direct path is the "predicted" flight path of the aircraft. Otherwise an adjustment of the scheduler to provide a non-conflicting scheduled time generates an input (a time delay E) to the computer in response to which a lengthened flight path is generated to produce a delay in the flight sufficient to meet the non-conflicting scheduled time. The lengthened flight path is now the predicted flight path for the aircraft and is the path which the aircraft must follow. The predicted flight path is supplied in terms of bearing to a flight simulator, the output of which is plotted and presented on the controller's PPI scope so that appropriate instructions may be given to the aircraft's pilot.

FIGURE 2 is an example of a typical flight path for an aircraft detected at a range of approximately 90 miles from a runway. As determined by the scheduler, if the aircraft continued on its direct path (solid line), it would arrive 180 seconds too soon, and hence a 180-second delay in its flight time is required. Since aircraft fly most economically at one optimum speed, the time is consumed by increasing the flight path. Most of this delay is accomplished by vectoring the aircraft on an initial offset heading (dotted line) until all but 30 seconds of the time has been used, when the aircraft is then "rolled out" onto an approximately radial course.

At a calculated point, the aircraft is instructed to begin a single continuous descent from initial to final-approach altitude, and is given this instruction in time to allow reaching traffic altitude with just time for slow-down and final-approach. As the aircraft comes closer to the airport, its scheduled delay is gradually taken out by a slightly curved approach path.

As aircraft level out on runway lineup, they are transferred to an instrument-landing (ILS) or ground-control (GCA) system, interleaved not only to prevent overtake on final approach, but spaced to achieve close timing precision at touchdown.

Figure 3:
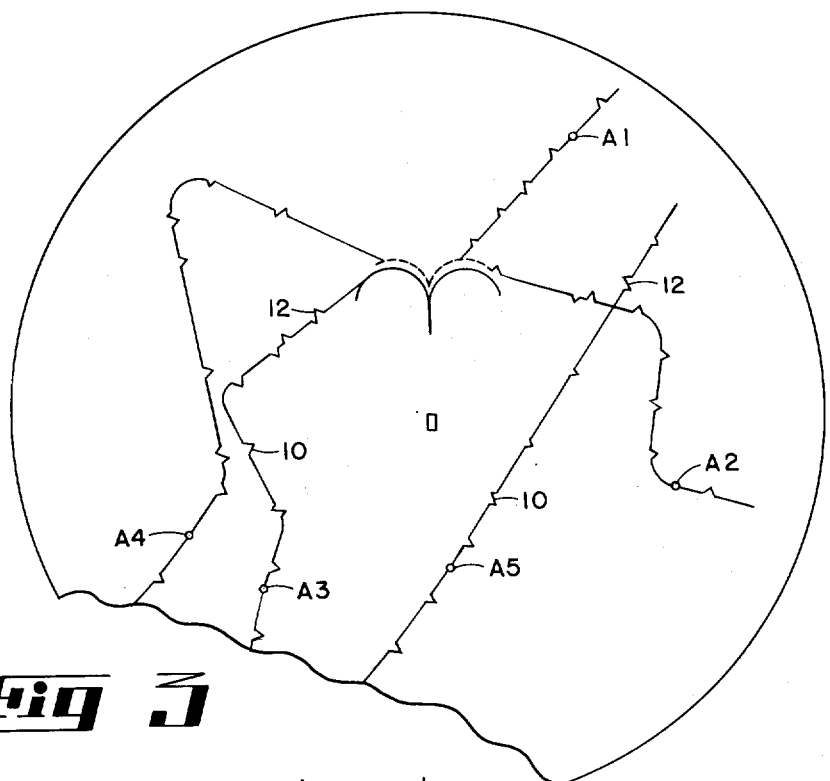
FIG. 3 is a typical radar presentation of several predicted flight paths of several aircraft.

FIG. 3 shows a typical radar presentation of four controlled aircraft A1, A2, A3, and A4 and one through aircraft A5 along with their respective plotted, predicted flight paths P1 to P5. It will be noted that each plotted path includes one-minute time markers 10 and five-minute time markers 12. In order to differentiate the one from the five-minute time markers, the markers 10 comprise a single blip, while the markers 12 comprise double blips. These markers are generated automatically by the computer in a manner hereinafter to be described. Although the predicted paths are plotted at an accelerated rate, the computers are keyed to "present" time, and hence the markers represent real future time, and an operator may readily observe the future times at which the aircraft paths will intersect. From this, he may determine whether or not the time spacing between the aircraft is safe. "Present" time is the real clock time at which each aircraft A1 to A5 is detected and "acquired" by the control system.

To illustrate how the various aircraft have been controlled by use of the plotted paths of FIGS. 2 and 3, it is noted that the predicted path of aircraft A1 is directly to the entry point, while the aircraft A3, A2, and A4 are on "delayed" or lengthened paths. The aircraft A5 is merely flying through the control zone and is uncontrolled, but its flight path is predicted and plotted so as to permit proper control of the other aircraft to avoid conflict. If the aircraft A2 were not additionally delayed, its direct flight path would intersect that of the aircraft A5 when both were at about the seven-minute marker. It is this type of fact which could not have been determined without a plot of the predicted paths.

The over-all system for providing the visual presentation of predicted paths to the controller is shown in the block diagram of FIG. 4. A conventional surveillance radar, generally indicated at 14, is used for detecting the various aircraft and for providing range and azimuth data ($r$ and $\theta$) to a conventional PPI scope 16. The radar $r\theta$ data output is also supplied to an acquisition unit 18.

The PPI scope is conventional and has the usual circular sweep in combination with a radial sweep. The circular sweep, representing azimuth, is synchronized with the rotation of the radar antenna, while the radial sweep, representing range, is synchronized with the main bang of the radar. A light detector 20 of the type disclosed and claimed in the copending application of Connelly et al., Serial No. 149,406, filed November 1, 1961, entitled "Luminous Annular Sight," assigned to the same assignee as this invention, is energized by the radar target representation on the PPI scope of a selected aircraft at the instant of the target echo return. The instant of target echo return detected by the light detector 20 is "present time," and this information is fed to the acquisition unit 18, the function of which is to generate two voltages representing "present" position of the aircraft, one voltage representing the present position of the detected aircraft in an X coordinate, and the other representing the present position of the aircraft in the Y coordinate. The X and Y voltages of the acquisition unit 18 are simultaneously supplied to a computer 22 (illustrated in FIG. 5) and to a conventional flight simulator 24.

Also fed into the computer 22 and the simulator 24 are voltages manually cranked in from a flight data unit 26. This data includes initial (cruise) velocity $V_i$, final velocity $V_f$, and initial altitude $A_i$. Real clock time is continuously fed into the computer from a clock 28. Since the computer now knows the present position (XY) of the detected aircraft, the present time (as determined from clock time at the instant of acquisition), and the aircraft's initial velocity, final velocity, and initial altitude; and since the location of the entry point and the runway touchdown point are fixed parameters which may be set into the computer, the computer can compute the direct path to be flown and determine the final approach time $t_c$ and the touchdown time $t_d$ when the aircraft follows the direct path. This information, represented by two different voltage levels, is fed to a scheduler 30 where an appropriate display of the scheduled times of all other controlled aircraft is presented along with the newly acquired aircraft.

The output voltages from the computer 22, $t_c$ and $t_d$, representing final approach time and touchdown time, respectively, are visually displayed on the scheduler 30, and similar outputs from other computers controlling other aircraft are also displayed on the same scheduler 30. The operator compares the times $t_c$ and $t_d$ of all the aircraft, and using his own judgment, decides whether or not the various aircraft under control are properly scheduled for non-conflicting touchdown and final approach times. If the last aircraft to be acquired appears to present a conflict, the scheduler is manually adjusted to provide a proper scheduled time for the aircraft, and this adjustment automatically provides an output E representing the delay between the direct path flight time and the scheduled flight time. The output E is fed back from the scheduler 30 into the computer 22.

Taking the delay E into account, the computer recomputes the path (the predicted path) and develops the instantaneous aircraft command heading required to be flown by the aircraft at the given speeds, altitudes, set and position set into the flight data panel 26. The heading is developed as a voltage $\phi$ representing the instantaneous bearing from present time to final approach time and is applied from the output of the computer 22 to the input of the simulator 24 causing the simulator "to fly" at the prescribed heading $\phi$. As in a conventional simulator, the output of the simulator 24 comprises two voltages representing the instantaneous X and Y position coordinates of the aircraft. The simulator feeds back the instantaneous XY position to the computer so that the computer always knows its instantaneous position as well as the scheduled times $t_c$ and $t_d$, and hence, continuously develops a heading voltage $\phi$ for the simulator 24 until the simulated predicted flight is completed. The XY voltages are applied to any conventional plotter 32 where a visual display of the predicted path of the aircraft is printed. By conventional TV mapping techniques, the plotted predicted path is scanned by a TV camera 34 which is synchronized with PPI scope 16, and the output from the camera 34 is then superimposed on the PPI scope. For purposes hereinafter to be explained, the computer is also provided with hard copy readout by means of a printer 38 of heading instructions at certain intervals, altitudes, speeds, and other data required to complete a flight to touchdown.

In order to describe operation of this novel air traffic control system, a typical aircraft entry to the system will now be described. The aircraft A4 perhaps sixty to ninety miles from the airport appears at the edge of the radar screen (FIG. 3), and the pilot radios in for control instructions. It has been noted that three other aircraft A1, A2, and A3 are already under control and that one uncontrolled aircraft A5 is passing through. The predicted paths of the aircraft A1, A2, A3, and A5 have previously been plotted.

The controller, having established communications with the aircraft, obtains such information as initial velocity, approach velocity, and altitude at which the aircraft can descend. The pilot is then given a specific heading to fly approximately in the direction of the airfield. The controller then points the light detector 20 towards a target A4 on the PPI scope, and he closes the light gun switch to trigger the acquisition unit and feed the present XY position into the computer. The scheduler then indicates the times $t_c$ and $t_d$ for flight over the most direct path. Since a delay is required in the example shown, the time $t_a$ is set as the scheduled time to the entry point, and the time $t_s$ as the scheduled time to touchdown. The delay, or error output voltage E between $t_a$ and $t_c$ is fed back into the computer and a new offset heading is determined and fed into the simulator.

It is recognized that the predicted flight path must be generated by the computer at an accelerated rate with respect to real time; for instance, sixty times faster. Thus an aircraft flight that will actually take ten minutes is simulated at ten seconds. As the future path is generated in fast time, the printer 38 prints out a chronological record of the data computed by the computer 22, and in practice such data, including heading and altitude, is printed out at every one-minute interval of the future time flight. The operator can refer to the printed copy for the purpose of issuing timely instructions and also, in the event of radar failure, the printed path appearing in the plotter 32, in conjunction with the printed instructions generated by the printer 38, can be used for temporary control of the aircraft.

As each minute of the actual flight passes, the radar target for each correctly controlled aircraft should progress one marker blip 12 along its plot (FIG. 3). Preferably, the predicted path is printed by the plotter 32 with an easily erasable ink so that an operator can progressively erase those portions of each flight path over which the aircraft has already traveled. Since erased portions of the predicted path no longer appear in the TV camera image, the erased path no longer appears on the PPI scope, hence reducing scope clutter.

While the computer is not a part of this invention, and while any computer, digital or analog, capable of performing the required arithmetic functions may be used, an analog computer which has been proven suitable for the purpose is illustrated functionally in FIG. 5. Each factor to be solved is shown diagrammatically in the computer of FIG. 5. Although the computer will not be described in detail, I am including here the data fed into the computer and the equations necessary for solving the various problems in computing the predicted flight path. In analyzing the computations, reference should be made to the computer of FIG. 5 and the control problem geometry of FIG. 1.

*Distance*

$r$—radar-to-aircraft range
$\theta$—radar-to-aircraft azimuth
$X''=r \sin \theta - X_e \pm X_0 - X_w$, $Y''=r \cos \theta - Y_e \pm Y_0 - Y_w$—rectilinear coordinates from center of turn-on-circle to aircraft
where
$X_e$, $Y_e$ are radar to entry point offsets, $Y_0$ is turn-on-point to entry-point offset, $X_0$ is diameter of turn-on circle, $X_w$, $Y_w$ are wind-drift entry point offsets
$\theta''=\arctan X''/Y''$—aircraft bearing from circle-center
$r''=\sqrt{X''^2+Y''^2}$—aircraft range from circle-center
$\theta'$, $r'$ (computation not shown)—aircraft range and bearing from turn-on point $a = \arcsin \left| \dfrac{X_0}{r''} \right| (0° < a < 90°)$—aircraft circle-center-to-tangent angle $d = d_t + d_a + |Y_0|$—direct-flight distance to entry point
$= r' + |Y_0|$ ($165° < \theta' < 195°$)—(inside stability cone)
where
$d_t = r'' \cos a$ is straight flight to tangency
and
$d_a = \dfrac{2\pi X_0 (180° - \theta'' + a)}{360°}$ is distance around circle

*Predicted Average Velocity*

$V_{Tai} = V_i \left( \dfrac{A_i}{45{,}000} K_d \pm Kt \right)$—ground speed at initial altitude
where
$V_i$ is "indicated air speed" flown by aircraft, $A_i$ is initial altitude of aircraft, $K_t$ is base-leveling air temperature constant (adjustable ±0.4), $K_d$ is air-density constant adjustable between 1.2 and 2.8 for 45,000 ft.)

$V_C = V_{Tai} - \dfrac{(V_{Tai} - V_i)}{2} \dfrac{A_i}{H^*}, H^* > A_i$—average velocity to the entry point (before begin descent)

$= \dfrac{(V_{Tai} - V_i)H}{2A_i} + V_i$, $H < A_i$—(after begin descent)

*Time*

$t_f = L / V_f$—time on final glide-slope L $t_M = \dfrac{2M}{V_i = W_f}$—time slowing down on level-out M where
$V_f$ is final-approach speed
$t_c = d / V_c$—time from present aircraft position to entry point
$t_d = t_c + t_m + t_f$—direct-path flight time from present aircraft position to touchdown
$t_s = t_a + t_m + t_f$—scheduled time to touchdown
($t_a$ is, therefore, scheduled time to entry point)
$E = t_a - t_c$—error between scheduled arrival time and direct-path flight time
(E is minus for aircraft ahead of schedule, plus for late arrival)

*Altitude*

Figure 6:
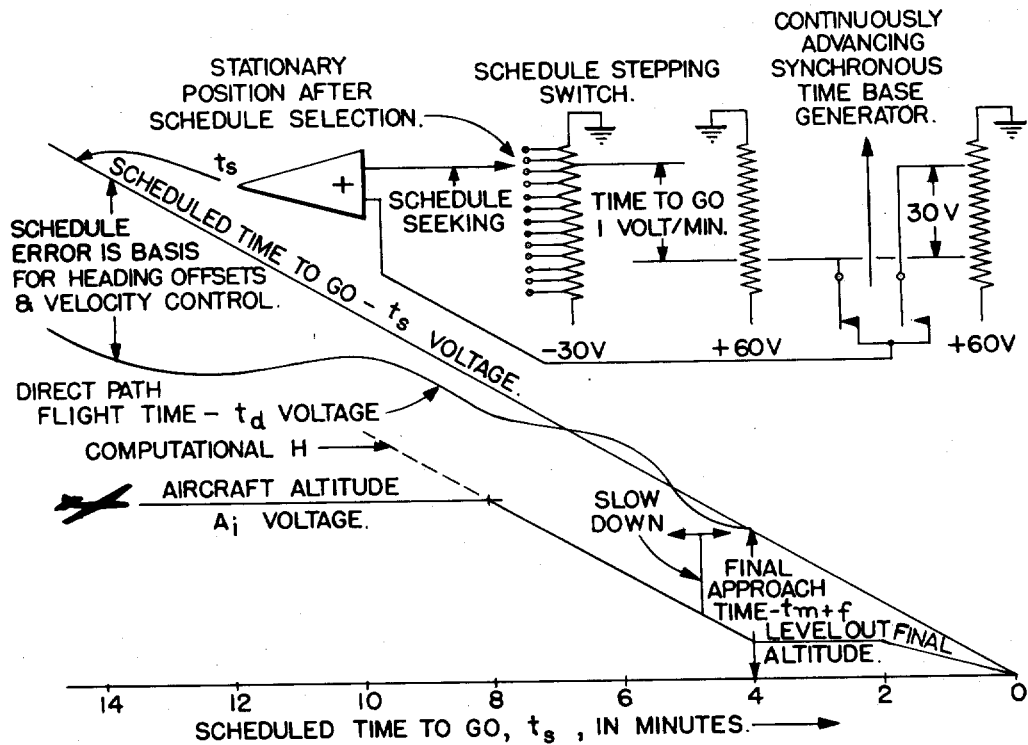
FIG. 6 illustrates the functional operation of the scheduler.

$H = Rt_a + h_e$—scheduled altitude
where $h_e$ is level-out altitude, R is rate of descent
(Note from FIG. 6 that computational H can extend beyond $A_i$ during initial level portion of flight, and that begin-descent occurs when H gets down to $A_i$.)
$R = R_s V_i / V_s$—rate of descent, standard or nonstandard, for glide slope where
$R_s$ is standard rate-of-descent for standard glide slope, $V_s$ is standard indicated velocity for standard glide slope.

*No Pass Zone*

$H_n = \frac{R_s}{V_s}$—altitude at no-pass zone boundary for glide slope $t_n = t_a - \frac{H_n}{R}$—scheduled time from aircraft position to no-pass-zone boundary

*Change Velocity*

$\Delta V = V_i (t_e/f_a - 1)$—velocity change which, executed over remaining direct-path flight to entry point, would result in arrival at scheduled time.

*Headings and Path-stretching*

$B = K_B \arccos (1 - E/100 \sec)$—heading offset from direct-path to entry point which delays aircraft at desired rate where
$K_B$ is gain of path-stretching function
$u$=runway heading offset from due south
$\phi = \theta'' - 180° \pm \alpha \pm B + u$ (plus for left circle, minus for right circle)—aircraft command heading
$\phi = \theta' - 180° \pm B + u$—when aircraft is in stability cone (within ±15° of lineup)
$\phi = \theta'' - 180° \pm a + u \pm$dogleg offset—in initial offset heading for dogleg pattern
$\phi = \theta'' - 180° \pm a \pm B + u \pm A$—in turn-circle anticipation zone where
$A = K_A V_C$—turn anticipation offset
and
$K_A$ adjustable—3°–16° per 100 knots
$\phi = \theta' - 180° - K_1 X'$—final lineup pursuit lead heading where $K_1$ is pursuit lead constant set at around 2 miles

*Wind Drift*

$$X_w = \frac{\Delta H_1 W_{x1} + \Delta H_2 W_{x2} + \cdots \Delta H_5 W_{x5}}{R},$$

$$Y_w = \frac{\Delta H_1 W_{Y1} + \Delta H_2 W_{Y2} + \cdots \Delta H_5 W_{Y5}}{R}$$—wind shift of entry point for wine drift (As aircraft descends, $\Delta H_1$, then $\Delta H_2$ etc., gradually drop out of the computation and the wind-shifted entry-point gradually drifts back to the geographical entry point.)

*Slow Down* initiate at $|Y_0| + K_s = 0$
where $K_s$ is slow-down shift-constant, set at about 10 sec. per mile.

The scheduling operation performed in the scheduler 30 is diagrammatically and functionally illustrated in FIG. 6. Stepping out from present time, the schedule stepping switch sequentially samples future landing intervals until a logical selection is made that allows minimum time for arrival and does not conflict with other arrivals. While the future flight path is being predicted, the stepping switch remains stationary, establishing a voltage difference with a 60 to 1 fast time synchronous time-base generator, which difference is representative of $t_s$, the remaining scheduled time to go. A time-base generator satisfactory for use in the system is disclosed and claimed in the copending application, Serial No. 64,918, of James A. Herndon, filed October 25, 1960, and assigned to the same assignee as this invention. As the time-base generator advances, $t_s$ linearly declines. The direct path flight time, $t_d$, is always less than $t_s$ at beginning of the schedule, and the difference, schedule error, is proportional to time the aircraft must be delayed. The computer develops a heading offset from the most direct path, and in 60 to 1 fast time diverts the simulator until the delay is accomplished. At the flight path prediction progresses, $t_d$ homes-in on $t_s$ delivering the simulator at level-out with proper timing and slow-down control to extrapolate its delivery at the runway close to the correct instant.

On basis of scheduled time-to-go and programmed rate-of-descent, the computer also commands the simulator to begin descent.

When the time-base generator reaches the same voltage as that on the stepping switch, the flight path prediction should be completed and the schedule is dropped. Thereafter the unscheduled stepping switch steps regularly to keep in synchronism with the real time. For a new schedule it again steps away into voltages representing future time.

As previously pointed out, the clock 28 is used for generating one-minute time markers 10 and five-minute time markers 12, and plotting the markers on the predicted path. The instant of target detection is "present time." The time markers 10 and 12 represent future time but are plotted at an accelerated rate along with the predicted path. That is to say, as each predicted path is plotted, the markers are superimposed on the plot to designate "predicted time" and although plotted at a rapid rate, the space between the minute markers represents the predicted flight path during a given future period of one minute. It will be seen that some means must be provided for synchronizing present time with future time; the arrangement of FIG. 7 is provided for this purpose.

Figure 7:
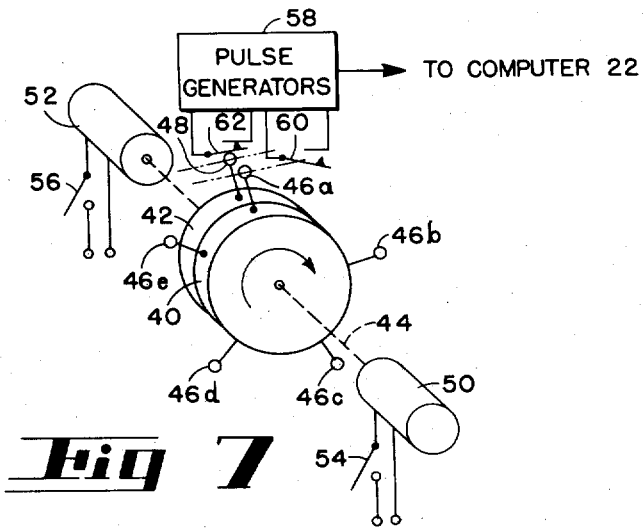
FIG. 7 is a schematic representation of a system which may be provided for generating time markers.

In FIG. 7 there are shown two disks 40 and 42, both fixedly mounted on a shaft 44. The disk 40 is provided with five equally spaced contacts $46_a$–$46_e$, while the disk 42 is provided with a single contact 48 positioned angularly just behind the contact $46_a$. The disks are arranged for rotation together either by a slow-speed "real-time" synchronous motor 50 or by a high-speed "predicted time" synchronous motor 52, switches 54 and 56, respectively, being provided for selectively connecting an appropriate alternating current source (not shown) to the motor 50 or the motor 52. Pulse generator circuits 58 having an output to the computer 22 are also provided with a minute marker switch 60 and a five-minute marker switch 62, both marker switches 60 and 62 being normally biased open. The switches 60 and 62 are positioned in the line of travel of the contacts $46_a$–$46_e$ and 48, respectively, and each is designed to be closed thereby for a short period. Upon the closing of the switch 60 by the contacts $46_a$–$46_e$, a pulse of one polarity (for the one-minute mark) is generated. Upon the closing of switch 62 by contact 48, a pulse of one polarity (for the five-minute mark) is generated. Thus, a single pulse of one polarity is generated by each contact $46_a$–$46_e$, while a pulse of opposite polarity is also generated just after the pulse is generated by the action of contact $46_a$.

In operation, prior to the plotting operation, the synchronous motor 50 operating at real-time speed drives the disks 40 and 42 so that the disks are always in real-time position, that is, the contact 48 is in the real clock five-minute time position. When a target is acquired and a plotting operation begins, at that instant, the switch 56 is closed and the switch 54 is simultaneously opened. The synchronous motor 52 then drives the disks at the high-speed rate of the plotting operation, for example, sixty times faster than the speed of synchronous motor 50. Since the disks were in real-time position at the instant of the start of the plotting operation, and since the time markers 10 and 12 are plotted at the same accelerated speed as the plot, the markers are thus keyed to and precisely represent real time on the plotted predicted path.

It will be recognized that many modifications and adaptations of this invention will be readily available to persons of ordinary skill in the art. For example, other components, such as the computer, scheduler, clock, etc., than those which have been schematically illustrated and described in this specification may be substituted. Furthermore, the system may be modified so as to automatically provide for the elimination of any portions of the predicted path already traversed or for the plotting of less than the total path so as to avoid display clutter. For that reason, I intend that the invention be limited only by the appended claims as interpreted in the light of the prior art.

What is claimed is:

1. In a radar air traffic control system for vectoring a piloted aircraft from its present position in space along precomputed predicted headings to the runway of an airport at a scheduled time, the combination comprising:
   a radar transmitter and receiver for tracking the position of said aircraft in two coordinates, said radar receiver including a cathode-ray tube for displaying the radar representations of said aircraft in said two coordinates;
   means at a given time for generating a fixed voltage output representative of the present position of said aircraft at said given time;
   electronic computing means for producing on an accelerated time scale output voltages representing the instantaneous predicted headings of said aircraft from said present position to said runway for said aircraft to arrive at said runway at said scheduled time, said electronic computing means being provided with said fixed voltage and with signal voltages representing data including the position of the runway and the velocity and altitude of said aircraft, said electronic computing means taking such data into account; and
   means responsive to said output voltage representing said predicted headings for producing a visual representation of the predicted path to be followed by said aircraft, said predicted path being superimposed on said cathode-ray tube, whereby the instantaneous position of said aircraft can be compared with said predicted path.

2. The invention as defined in claim 1 wherein means are provided for superimposing time markers on said predicted path, said time markers representing the predicted position of said aircraft at certain times along said predicted path.

3. The invention as defined in claim 2 wherein means are provided for printing said headings at said certain times.

4. The invention as defined in claim 1 wherein said means for producing a visual representation of the predicted path includes a flight simulator having an input supplied with said output voltages representing the instantaneous predicted headings of said aircraft and having output voltages representing the predicted instantaneous position of said aircraft;
   means responsive to said output voltages representing the predicted instantaneous position of said aircraft for producing a visual plot of said instantaneous positions from said given time to said scheduled time;
   a video scanner having an output coupled to said cathode-ray tube for scanning said visual plot, the sweep of said video scanner being synchronized with the sweep of said cathode-ray tube.

5. The invention as defined in claim 4 wherein the output voltages from said flight simulator are continuously applied to said electronic computing means.

6. In a radar air traffic control system for vectoring a piloted aircraft from its present position in space along pre-computed predicted headings to the runway of an airport at a scheduled time, said system including a radar transmitter and receiver for tracking said aircraft in two coordinates, said receiver including a cathode-ray tube for displaying radar representations of said aircraft in said two coordinates, and having outputs representing the instantaneous position of said aircraft, the combination comprising:
   means for computing the flight time and the time of arrival at said runway over the most direct path from present position to said runway;
   means at a given time for generating signals representing the instantaneous headings to be flown by said aircraft to said runway, taking into account the time difference between said time of arrival and said scheduled time;
   means for visually plotting said generated signals with respect to an accelerated time base having a duration equal to the time said signals are generated but representing actual time to visually depict the predicted flight path of said aircraft; and
   means for superimposing said visually depicted path on said cathode-ray tube whereby the instantaneous position of said aircraft can be compared with said predicted path.

7. The invention as defined in claim 6 wherein means are provided for superimposing time markers on said predicted path, said time markers representing the predicted position of said aircraft at certain times along said predicted path.

8. The invention as defined in claim 7 wherein means are provided for printing said headings at said certain times.

9. The invention as defined in claim 6 wherein said means for visually plotting said generated signals includes a flight simulator having an input supplied with said generated signals representing the instantaneous headings to be flown by said aircraft and having output signals representing the predicted instantaneous position of said aircraft;
   means responsive to said output signals representing the predicted instantaneous position of said aircraft for producing a visual plot of said instaneous positions; and
   a video scanner having an output coupled to said cathode-ray tube for scanning said visual plot, the sweep of said video scanner being synchronized with the sweep of said cathode-ray tube.

10. The invention as defined in claim 7 wherein said time markers are produced by a normally de-energized pulse generator circuit;
    means for energizing said circuits at given time intervals, said intervals being a fixed fraction of real clock time intervals, said means being synchronized at said second given time with real clock time, the output from said pulse networks being superimposed on said generated signals.

11. In a radar air traffic control system for vectoring a piloted aircraft from its present position in space along pre-computed predicted headings to the runway of an airport at a scheduled time, said system including a radar transmitter and receiver for tracking said aircraft in two coordinates, said receiver including a cathode-ray tube for displaying radar representations of said aircraft in said two coordinates, and having outputs representing the instantaneous position of said aircraft, the combination comprising:
   means at a given time for generating signals representing the instantaneous headings over the most direct path to be flown by said aircraft from its present instantaneous position to said runway;
   means for computing the flight time and the time of arrival at said runway over said most direct path;
   means at a second given time for again generating signals representing the instantaneous headings to be flown by said aircraft to said runway, taking into account the time difference between said time of arrival and said scheduled time;
   means for visually plotting said again generated signals with respect to an accelerated time base having a duration equal to the time said signals are generated but representing actual time to visually depict the predicted flight path of said aircraft; and means for superimposing said visually depicted path on said cathode-ray tube whereby the instantaneous position of said aircraft can be compared with said predicted path.

References Cited in the file of this patent

UNITED STATES PATENTS

| | | |
|---|---|---|
| 2,825,054 | Ernst | Feb. 25, 1958 |
| 3,018,959 | Thomas | Jan. 30, 1962 |
| 3,081,454 | Gabelman et al. | Mar. 12, 1963 |
| 3,088,107 | Martinessen et al. | Apr. 30, 1963 |

OTHER REFERENCES

"Electronics," Feb. 1, 1963, "New Air Traffic System Predicts Flight Paths," by Moxley and Inderhees, pp. 27–31.

UNITED STATES PATENT OFFICE
CERTIFICATE OF CORRECTION

Patent No. 3,137,849            June 16, 1964

Stephen D. Moxley, Jr.

It is hereby certified that error appears in the above numbered patent requiring correction and that the said Letters Patent should read as corrected below.

Column 4, line 57, for "the" read -- that --; column 6, lines 52 and 53, the equation should appear as shown below instead of as in the patent:

$$t_M = \frac{2M}{V_+ = V_f}$$

column 7, line 14, for "$\Delta V = V_i(t_e/f_a - 1)$" read -- $\Delta V = V_i(t_c/t_a - 1)$ --; column 7, line 45, for "wine" read -- wind --; column 8, line 1, for "At" read -- As --.

Signed and sealed this 3rd day of November 1964.

(SEAL)
Attest:

ERNEST W. SWIDER            EDWARD J. BRENNER
Attesting Officer            Commissioner of Patents